(12) United States Patent
Cho

(10) Patent No.: US 7,300,212 B2
(45) Date of Patent: Nov. 27, 2007

(54) SEMICONDUCTOR OPTICAL PACKAGE

(75) Inventor: Shi-Yun Cho, Seoul (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 580 days.

(21) Appl. No.: 10/867,033

(22) Filed: Jun. 14, 2004

(65) Prior Publication Data
US 2005/0100348 A1 May 12, 2005

(30) Foreign Application Priority Data
Nov. 10, 2003 (KR) ............... 10-2003-0079106

(51) Int. Cl.
G02B 6/36 (2006.01)
H01S 3/04 (2006.01)
(52) U.S. Cl. ............... 385/88; 385/92; 385/93; 385/49; 372/34; 372/36
(58) Field of Classification Search ............ 372/34–36; 385/14
See application file for complete search history.

(56) References Cited

U.S. PATENT DOCUMENTS 5,208,826 A * 5/1993 Kelly .................. 372/107
2002/0057718 A1* 5/2002 Ahn et al. ............ 372/12
2004/0198079 A1* 10/2004 Aronson et al. ........ 439/76.1

* cited by examiner

Primary Examiner—Quyen P Leung
(74) Attorney, Agent, or Firm—Cha & Reiter, LLC

(57) ABSTRACT

A semiconductor optical package for optical communication includes a cooling plate dissipating internal heat generated from the semiconductor optical package and having one or more grooves passing through top and bottom surfaces thereof. There is a housing having one or more slots formed on its bottom face, the housing at least partly enclosing an optical transmission module resting on the cooling plate such that the respective slots thereof correspond to the respective grooves of the cooling plate. There are also one or more screws passing through the grooves and inserted into the slots for coupling the housing to the optical transmission module.

14 Claims, 2 Drawing Sheets

SEMICONDUCTOR OPTICAL PACKAGE

CLAIM OF PRIORITY

This application claims priority under 35 U.S.C. § 119 to an application entitled "Semiconductor Optical Package" filed in the Korean Intellectual Property Office on Nov. 10, 2003 and assigned Serial No. 2003-79106, the contents of which are incorporated herein by reference.

BACKGROUND OF THE INVENTION

1. Field of the Invention

The present invention relates generally to a semiconductor optical package. More particularly, the present invention relates to a semiconductor optical package with an optical transmission module having a small form factor (SFF) structure that is suitable for ultra-high speed communication.

2. Description of the Related Art

There are conventional optical transmission modules, particularly TO-can type optical transmission modules, small form factor (SFF) type optical transmission modules, and the like, etc., all of which are used for optical transmissions. While the TO-can type optical transmission modules are used because they are inexpensive, the trade-off is that To-can type optical transmission modules operate at low-speeds. There are also SFF type optical transmission modules having a high density of integration of optical devices are used for stable, high-speed optical communications. SFF type modules are considerably more expensive than the To-can type.

Another drawback of the SFF type optical transmission modules when used in high-speed optical communications that a large amount of heat is dissipated. One way to alleviate the problem of heat dissipation is to use semiconductor optical packages having a plurality of cooling means to offset the heat generated by the modules.

FIG. 1 is a longitudinal cross-sectional view of a conventional semiconductor optical package. Referring to FIG. 1, the semiconductor optical package includes a cooling plate 102 for dissipating heat generated from the semiconductor optical package to the exterior of the package and an SFF type optical transmission module 101 resting on the cooling plate 102, so that the heat transfer from the SFF transmission module 101 to the cooling plate by conduction.

The optical transmission module 101 includes a semiconductor laser 150 for generating a light signal, a photo diode 140 for monitoring the intensity of the light signal generated from the semiconductor laser 150, a substrate 160 for supporting the semiconductor laser 150 and the photo diode 140, thermoelectric cooling devices 120 and 130 for maintaining the internal temperature of the optical transmission module 101 at a constant level, an optical fiber 180 for outputting the light signal generated from the semiconductor laser 150 to the exterior of the optical transmission module 101, and a housing 110 for mounting the devices 120, 130, 140, 150, 160.

The housing 110 has a butterfly structure in which projections 111a and 111b extend at either side on its bottom face resting on the cooling plate 102. The projections 111a and 111b are formed to allow one or more grooves 112 for coupling the cooling plate 102 to the housing 110 to pass therethrough.

The cooling plate 102 dissipates heat generated from the interior of the optical transmission module 101, and the optical transmission module 101 rests on the cooling plate 102. Slots (not shown) are formed at locations corresponding to the grooves 112 of the projections 111a and 111b.

The optical transmission module 101 is fixed on the cooling plate 102 by screws (not shown) inserted from the grooves 112 of the projections 111a and 111b into the slots of the cooling plate 102, so that the internal heat is dissipated to an exterior through the cooling plate 102.

However, the above-described conventional optical transmission module having the butterfly-shaped housing presents a problem in that it is quite difficult to be adaptive for a miniaturized semiconductor optical package to be used for high-speed optical communication.

SUMMARY OF THE INVENTION

The present invention is provided in part to overcome at least some of the above-mentioned problems in the art, by providing a miniaturized semiconductor optical package for ultra-high-speed optical communication with improved heat dissipation efficiency than known heretofore.

According to an aspect of the present invention, there is provided a semiconductor optical package for optical communication, having a cooling plate that dissipates internal heat generated from the semiconductor optical package. The cooling plate also has one or more grooves passing through its top and bottom surfaces thereof. The package is arranged in a housing having one or more slots formed on its bottom face, wherein the housing includes an optical transmission module resting on the cooling plate such that the respective slots thereof correspond to the respective grooves of the cooling plate; and one or more screws passing through the grooves and inserted into the slots, for coupling the optical transmission module to the housing.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION

The present invention will now be described in detail with reference to certain aspects thereof as illustrated in the accompanying drawings. In the following description, certain well-known functions or structures have not been described in detail when such description might obscure the description of the present invention.

Figure 1:
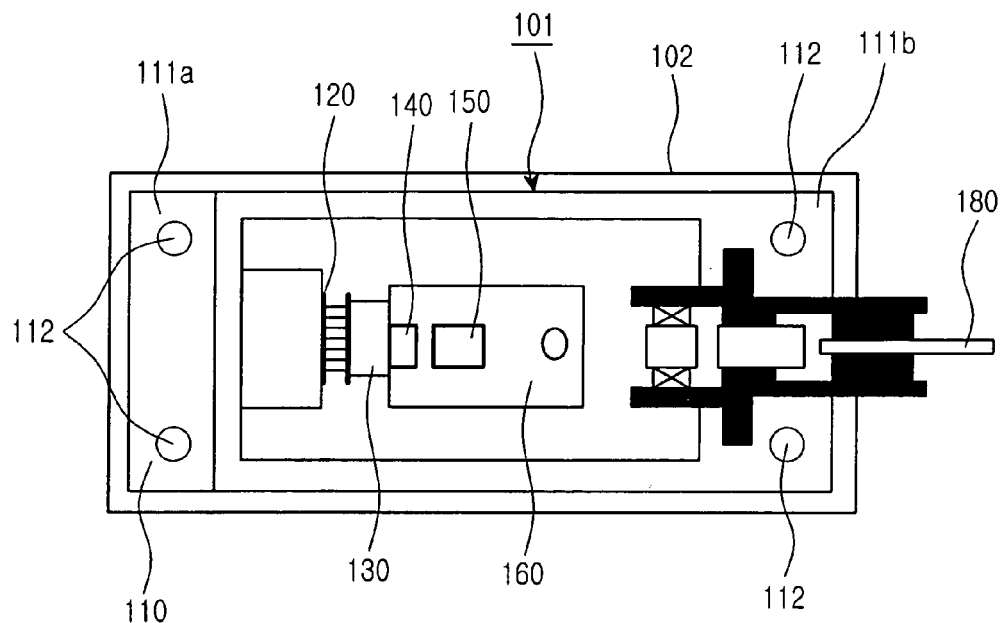
FIG. 1 is a longitudinal cross-sectional view of a conventional semiconductor optical package.
Figure 2:
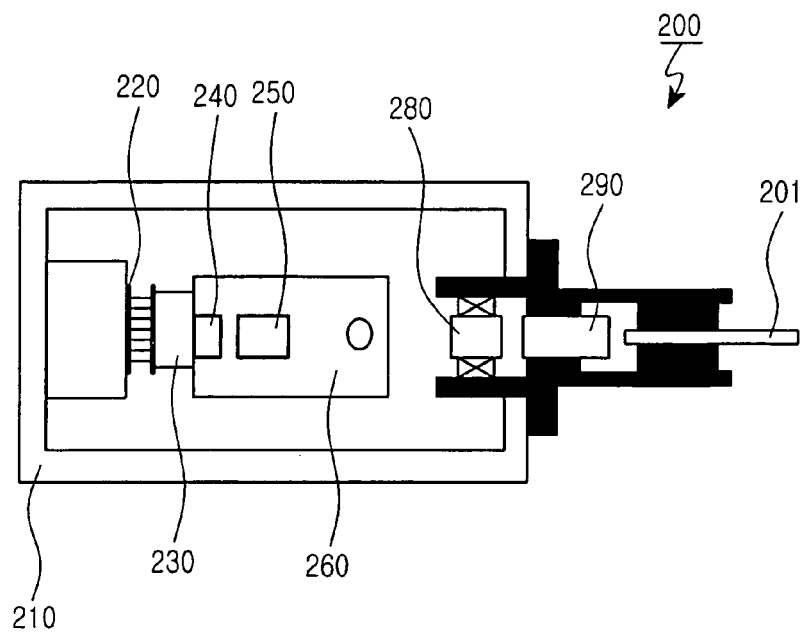
FIG. 2 illustrates an optical transmission module according to an aspect of the present invention.
Figure 3:
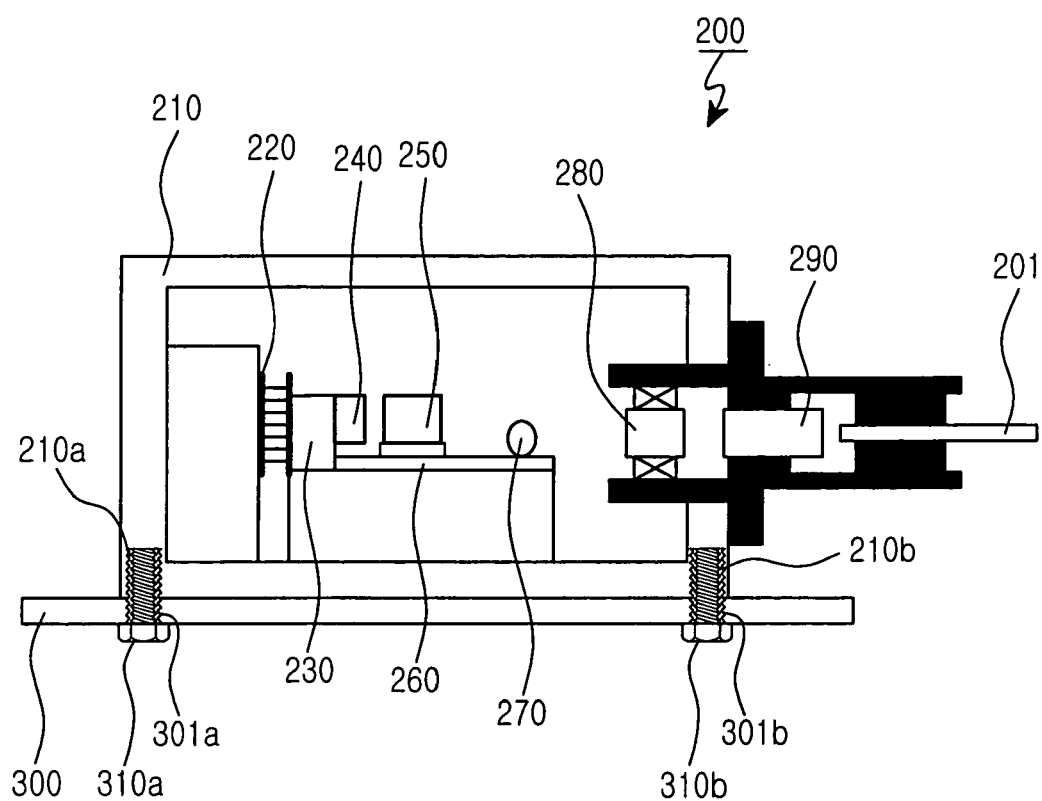
FIG. 3 illustrates a lower portion of a semiconductor optical package having the optical transmission module shown in FIG. 2.

FIG. 2 illustrates an optical transmission module according to an aspect of the present invention, and FIG. 3 illustrates a lower portion of a semiconductor optical package having the optical transmission module shown in FIG. 2.

Referring to FIGS. 2 and 3, the semiconductor optical package as presently invented includes a cooling plate 300 for dissipating heat generated from the semiconductor optical package to an exterior of the device and an optical transmission module 200 rests on the cooling plate 300. In addition, one or more screws 310a and 310b are used to couple the cooling plate 300 to the optical transmission module 200.

The cooling plate 300, on which the optical transmission module 200 rests, dissipates heat generated from the semiconductor optical package to the exterior of the device, and has one or more grooves 301a and 301b passing through the top and bottom surfaces thereof so as to permit passage of the screws 310a and 310b therethrough.

The optical transmission module 200 includes a submount 260, a light source 250 arranged on the submount 260, the light source for generating a light signal, a photo diode 240 for monitoring the intensity of the light signal generated from the light source 250, a thermistor 230, a thermoelectric cooling device 220 for controlling the internal temperature of the optical transmission module 200 to be maintained at a constant level, an optical fiber 201 to output the light signal generated from the light source 250 to the exterior of the optical transmission module 200, a plurality of lenses 270 and 290, an isolator 280, and a housing 210 for mounting the above-stated items The submount 260 supports the light source 250 and the photo diode 240, and the light source 250 and the photo diode 240 are fixed on the submount 240 by flip-chip bonding using solder bumps.

The specific light source 250 may be determined according to need, and for purposes of illustration and not for limitation include a Febry-Perot laser, a distributed feedback laser, an electroabsorption modulator integrated semiconductor laser and the like, and a light signal having a predetermined wavelength.

The photo diode 240 arranged at one side of the submount 260 continuously monitors the light signal generated from the light source 250.

The lenses 270 and 290 converge the light signal generated from the light source 250 into one end of an optical fiber 201, and usable examples thereof include a ball lens 270 disposed between the light source 250 and the isolator 280, and a grin lens 290 disposed between the isolator 280 and the optical fiber 201, or the like.

The isolator 280, which is positioned between the grin lens 290 and the ball lens 270, allows the light signal input from the ball lens 270 to pass through the grin lens 290 and prevents at least some of light input from the grin lens 290 from being input to the ball lens 270.

The optical fiber 201 is aligned in an opening (not shown) formed at one side of the housing 210 using a V-groove (not shown) in a passive or active alignment procedure so as to be arranged opposite to and facing the light source 250, and then fixed on the housing 210 using an epoxy.

The thermistor 230 is positioned on one side of the submount 260 and senses the internal temperature of the optical transmission module 200.

The thermoelectric cooling device 220 compares the internal temperature of the optical transmission module 200 that is sensed by the thermistor 230 with a desired temperature, and the cooling device operates to adjust the temperature of the optical transmission module 200 if the comparison results in a disparity. In other words, the thermoelectric cooling device 220 dissipates excessive heat generated in the optical transmission module 200 outside through the cooling plate 300.

The housing 210 has one or more slots 210a and 210b on its bottom face and is mounted on the cooling plate 300 such that the respective slots 210a and 210b correspond to the respective grooves 301a and 301b of the cooling plate 300.

The number of the screws 310a and 310b corresponds to that of the grooves 301a and 301b, and the screws 310a and 310b are inserted into the slots 210a and 210b of the housing 210 from the bottom surface of the cooling plate 300, thereby coupling the optical transmission module 200 to the cooling plate 300 and acting as a heat transfer element.

As described above, the semiconductor optical package for ultrahigh-speed optical communication according to the present invention can efficiently dissipate heat generated from the optical transmission module by fixing the optical transmission module on the cooling plate having a plurality of grooves formed through the top and bottom surfaces of the cooling plate, and can be miniaturized.

While the invention has been shown and described with reference to certain aspects thereof, it will be understood by those skilled in the art that various changes in form and details may be made therein without departing from the spirit and scope of the invention as defined by the appended claims. For example, while the specification refers to screws, there could be pins, bolts, nails, rivets, fasteners, welding points, all of the aforementioned being just a few examples of items that are both within the spirit of the invention and the scope of the appended claims.

What is claimed is:

1. A semiconductor optical package for optical communication comprising:
    a cooling plate dissipating internal heat generated from the semiconductor optical package and having one or more grooves passing through top and bottom surfaces thereof; and
    a housing without a butterfly structure for attachment to the semiconductor optical package having one or more slots formed on its bottom face, the housing comprising an optical transmission module resting on the cooling plate such that the respective slots thereof correspond to the respective one or more grooves in the cooling plate, and adapted for receiving one or more fasteners passing through the grooves and inserted into the slots for coupling the optical transmission module to the housing, the optical transmission module further includes a submount; a light source arranged on the submount, for generating a light signal having a predetermined wavelength; a photo diode for monitoring the intensity of the light signal generated from the light source; a thermistor positioned on one side of the submount and sensing an internal temperature of the optical transmission module; and a thermoelectric cooling device for comparing the internal temperature of the optical transmission module sensed by the thermistor with a desired temperature, and adjusting the temperature of the optical transmission module according to the comparison result.

2. The semiconductor optical package of claim 1, wherein the fasteners are selected from the group consisting of screws, pins, bolts, nails, rivets, fasteners, welding points.

3. The semiconductor optical package of claim 1, wherein the optical transmission module further comprises:
    an optical fiber to output a light signal generated from the light source to an exterior of the optical transmission module;
    a ball lens disposed between the optical fiber and the light source, for converging the light signal generated from the light source into one end of the optical fiber; and
    an isolator interposed between the optical fiber and the ball lens, for preventing light from being incident to the ball lens from the optical fiber.

4. The semiconductor optical package of claim 3, wherein the optical transmission module further comprises a grin lens disposed between the isolator and the optical fiber, for focusing the light signal onto the optical fiber.

5. The semiconductor optical package of claim 1, wherein the light source comprises a Febry-Perot laser.

6. The semiconductor optical package of claim 1, wherein the light source comprises a distributed feedback laser.

7. The semiconductor optical package of claim 1, wherein the light source comprises an electroabsorption modulator integrated semiconductor laser.

8. A method for providing a semiconductor optical package, comprising the steps of:
  (a) providing a cooling plate dissipating internal heat generated from a semiconductor optical package and having one or more grooves passing through top and bottom surfaces thereof; and
  (b) attaching a housing without a butterfly structure to a semiconductor optical package having one or more slots formed on its bottom face, the housing comprising an optical transmission module resting on the cooling plate such that the respective slots thereof correspond to the respective one or more grooves in the cooling plate, and adapted for receiving one or more fasteners passing through the grooves and inserted into the slots for coupling the optical transmission module to the housing, the optical transmission module further configured to: generate a light signal having a predetermined wavelength by providing a light source arranged on the submount; monitor the intensity of the light signal generated from the light source by a photo diode; sense an internal temperature of the optical transmission module: and compare the internal temperature of the optical transmission module sensed by the thermistor with a desired temperature, and adjusts the temperature of the optical transmission module according to the comparison result.

9. The method of claim 8, further comprising the step of:
  (c) fastening the semiconductor optical package to the housing with at least one of screws, pins, bolts, nails, rivets, welding points, and sintering.

10. The method according to claim 8, further comprising the steps of:
  arranging an optical fiber to receive an output of a light signal generated from a light source to an exterior of the optical transmission module;
  disposing a ball lens between the optical fiber and the light source for converging the light signal generated from the light source into one end of the optical fiber; and
  interposing an isolator between the optical fiber and the ball lens for preventing light from being incident to the ball lens from the optical fiber.

11. The method according to claim 10, further comprising disposing a grin lens between the isolator and the optical fiber for focusing the light signal onto the optical fiber.

12. The method of claim 8, wherein the light source comprises a Febry-Perot laser.

13. The method of claim 8, wherein the light source comprises a distributed feedback laser.

14. The method of claim 8, wherein the light source comprises an electroabsorption modulator integrated semiconductor laser.

* * * * *